(No Model.)

R. S. WARING.
COMPOUND ELECTRIC CABLE.

No. 294,538. Patented Mar. 4, 1884.

Witnesses
C. L. Parker
R. H. Whittlesey

Inventor
Richard S. Waring
by George H. Christy
His Attorney.

UNITED STATES PATENT OFFICE.

RICHARD S. WARING, OF PITTSBURG, PENNSYLVANIA.

COMPOUND ELECTRIC CABLE.

SPECIFICATION forming part of Letters Patent No. 294,538, dated March 4, 1884.

Application filed July 20, 1883. (No model.)

*To all whom it may concern:*

Be it known that I, RICHARD S. WARING, a citizen of the United States, residing at Pittsburg, county of Allegheny, State of Pennsylvania, have invented or discovered a new and useful Improvement in Compound Electric Cables; and I do hereby declare the following to be a full, clear, concise, and exact description thereof, reference being had to the accompanying drawings, making a part of this specification, in which—like letters indicating like parts—

Figure 2:
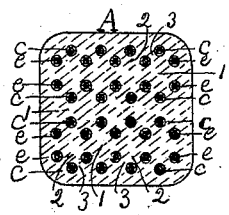
Figure 1:
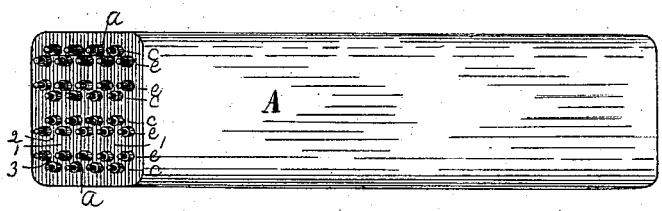

Figure 1 is a perspective view of my improved compound cable, and Fig. 2 is a transverse sectional view of the same.

My present invention relates to compound electric cables; and, in general terms, it consists of a cable having a body or covering of metal with a number of tubular passages therethrough, within which the insulated wires are inclosed, such wires being arranged in pairs of rows, the two rows of a pair being in closer proximity than the adjacent rows of succeeding pairs, and also closer than the adjacent wires in a single row, as hereinafter more fully described and claimed.

In the manufacture of "lead-covered cables," so-called, it is customary to make use of a lead-press, the lead being applied to the wires under pressure at the point of the nipples or of the wire-inclosing mandrel. Where a considerable number of wires are included in one cable, material difficulty is encountered in pressing sufficient quantity of lead between the wires to fill the center and secure adhesive union of the lead entering from different directions, so as to give a homogeneous, unbroken, and continuous body of wire-covering throughout the entire section of cable. As the wires have been heretofore arranged in cables of this class, considerable space was required between each and all the wires in order to provide sufficient passages for flow of lead. Such separation of wires is objectionable on account of increased quantity of lead required, and also increased bulk or size and weight of cable.

The purpose of my invention is to provide for the requisite lead-passages to the central parts of the cable to facilitate flow of lead into the same, and also to secure a closer or more compact arrangement and grouping of wires than heretofore, whereby a large number of wires may be included in a cable of comparatively small sectional area.

In the drawings, A represents a body of metal, lead being preferred, though other equivalent soft ductile metal or alloy may be employed adapted to be formed into a homogeneous or integral body by exudation and pressure in a lead-press. Tubular passages $a$ are formed longitudinally through this body by means of the core or wire-holding mandrel, separate tubular nipples being employed, by preference, on the end of the core, though other suitable form or construction of core may be employed, if desired. These passages $a$ inclose the insulated conducting-wires $c\ e$, which are arranged or grouped in pairs of rows, the wires $c$ forming one row of each pair and the wires $e$ the other row of each pair. The two rows constituting such a pair are in close proximity, or closer than the adjacent rows of successive pairs; also, the individual wires in a pair of rows alternate in order—that is, the wires $c$ occur about midway of the intervals between wires $e$, and the adjacent wires, $c\ e$, in the two rows of a pair are in closer proximity than the adjacent wires $c\ c$ or $e\ e$ of either row. By these features of arrangement comparatively wide passages, as at 1, are secured between pairs of rows, and also between the adjacent wires of each row, as at 2, and lead may flow with comparative freedom along these widened passages or channels to the points of closest proximity of wires, as at 3, which are at or near the points of meeting of the lead entering from different directions through or along the several channels. Another feature of arrangement which I employ in this connection is to make the adjacent rows in successive pairs correspond in number and order of position of wires, so that the wires in such rows occur in common transverse lines, and do not alternate, as do the wires in two rows in close proximity, composing a pair. This arrangement groups the wires in two adjoining pairs approximately in circles of six wires, (see Fig. 2,) the inclosed area of such a circle being supplied with lead through the widened channels between pairs of rows. Such circular area serves, in a measure, as an inner channel, through which or from which the lead is applied to the inner surfaces of the several surrounding wires, so that, viewed in this form or feature of grouping, substantially the same feature of advantage is secured as above described—namely, comparatively wide channels for lead-flow to the interior of the cable, and a direct application of lead from such channels to the major part of the wire-surfaces, which are exposed to such channels on all sides, except adjacent to the nearest wire in the companion row of the pair, and these points of closest proximity of wires correspond to the point at which union is formed between supplies of lead entering from different directions. Properly speaking, therefore, lead does not flow through but into these narrowest spaces. The alternate succession of wires in a pair of rows is an important feature in this connection, because by means of it each individual wire is exposed on opposite sides in the direct lines of lead-flow, leaving but a comparatively small amount of surface on each wire to be covered between closely-approximating wires. By grouping or arranging the wires in this manner, flow of lead from the surface to the interior of the cable is materially facilitated, and in securing this increased facility no sacrifice is made in the number of wires included in the cable. On the contrary, the number which can in this improved arrangement be covered successfully in a given area of section is actually much greater than could be included in the same area as heretofore arranged, because the difficulties heretofore encountered in securing lead-supply to the interior of the cable are greatly reduced or overcome. These features of improvement are also of material advantage in the construction of the core or mandrel for a cable containing many wires. This is not claimed herein, however, but is included in the subject-matter of a separate application for patent filed by me even date herewith.

I have also included in another application made by me this date a cable embracing the features of construction and arrangement contained in one pair (two rows) of wires, as above described, and therefore I make no claim herein to a cable containing one such pair of rows, my present invention having reference more particularly to a cable composed of two or more such pairs contained within a common body of covering.

I claim herein as my invention—

1. An electric cable having a body or protective covering of soft ductile metal or equivalent alloy, with tubular passages therethrough inclosing insulated conducting-wires, such wires being arranged in pairs of rows, the two rows composing a pair being in closer proximity than successive pairs, substantially as set forth.

2. An electric cable having a body of soft ductile metal or alloy, with passages therethrough inclosing insulated conducting-wires, such wires being arranged in pairs of rows, the two rows composing a pair being in closer proximity than successive pairs, and the adjacent wires taken across the two rows of a pair being in closer proximity than adjacent wires taken in the same row, substantially as set forth.

3. An electric cable having a body of soft ductile metal or alloy with passages therethrough inclosing insulated conducting-wires, such wires being arranged in pairs of rows, the two rows composing a pair being in closer proximity than successive pairs, and the wires in one row of each pair alternating in order of position with those of the other row of the pair, substantially as set forth.

4. An electric cable having a body, A, of soft ductile metal or alloy, with passages $a$ therethrough inclosing insulated conducting-wires $e$ $e$, such wires being arranged in pairs of parallel rows, the two rows of a pair being in closer proximity than the adjacent rows of successive pairs, the wires $e$ in one row of a pair alternating in order of positions with the wires $e$ of the companion row of the pair, and the wires in the adjacent rows of successive pairs having the same order of succession and occurrence, substantially as set forth.

5. An electric cable having a body of soft ductile metal or alloy, with passages therethrough inclosing insulated conducting-wires, such wires being arranged in pairs of rows; the two rows of a pair being in closer proximity than successive pairs, the individual wires in the two rows of a pair alternating in order of succession, and the adjacent wires taken in different rows of a pair being in closer proximity than adjacent wires taken in the same row, substantially as set forth.

In testimony whereof I have hereunto set my hand.

RICHARD S. WARING.

Witnesses:
R. H. WHITTLESEY,
C. L. PARKER.